(12) United States Patent
Tkachenko

(10) Patent No.: US 12,644,081 B1
(45) Date of Patent: Jun. 2, 2026

(54) MAGNETIC TREATMENT OF FLUIDS TO BE USED IN THE PRODUCTION OF ALCOHOLIC BEVERAGES WITH HYDROMAGNETIC RESONATORS

(71) Applicant: Standard Magnetics USA, Inc., Palo Alto, CA (US)

(72) Inventor: Yury Tkachenko, Dubai (AE)

(73) Assignee: NEAU BRANDS, INC., San Mateo, CA (US)

( * ) Notice: Subject to any disclaimer, the term of this patent is extended or adjusted under 35 U.S.C. 154(b) by 0 days.

(21) Appl. No.: 18/608,815

(22) Filed: Mar. 18, 2024

Related U.S. Application Data

(63) Continuation of application No. 17/144,417, filed on Jan. 8, 2021, now abandoned.

(Continued)

(51) Int. Cl.
*C02F 1/48* (2023.01)
*A23L 2/54* (2006.01)
(Continued)

(52) U.S. Cl.
CPC ........... *C12H 1/16* (2013.01); *B01D 19/0036* (2013.01); *B01D 19/0042* (2013.01);
(Continued)

(58) Field of Classification Search
CPC .. C12H 1/16; B01D 19/0036; B01D 19/0042; B01D 19/0063; B03C 1/023; C02F 1/20;
(Continued)

(56) References Cited

U.S. PATENT DOCUMENTS 5,783,074 A * 7/1998 Stanley .................. B82Y 15/00
210/222
7,757,866 B2 7/2010 Mccutchen
(Continued)

FOREIGN PATENT DOCUMENTS

WO WO-2016178170 A1 * 11/2016 ............. F02M 27/04
WO WO-2019138352 A1 * 7/2019 ........... H02K 44/085

OTHER PUBLICATIONS

HomebrewTalk [magnetized water?, 2013], p. 1-3. web: https://www.homebrewtalk.com/threads/magnetized-water.412243/ (Year: 2013).*

(Continued)

*Primary Examiner* — Viren A Thakur
*Assistant Examiner* — Luis Eugenio Diou Berdecia
(74) *Attorney, Agent, or Firm* — Shay Glenn LLP

(57) ABSTRACT

Introduced here are treatment systems and associated processes for treating fluids to be used in the production of alcoholic beverages using magnetic fields. A treatment system can comprise a hydromagnetic resonator that creates the magnetic fields through which fluid can be directed. A hydromagnetic resonator can include at least one expansion chamber that provides a tortuous path along which fluid is able to flow through a magnetic field created by an arrangement of permanent magnets and at least one convergent-divergent nozzle designed to accelerate the flow of fluid passing through a throat segment. Fluid directed through a hydromagnetic resonator will be magnetically treated while flowing through the magnetic field created by the arrangement of permanent magnets within each expansion chamber and then pressurized while flowing through the throat segment of each convergent-divergent nozzle.

14 Claims, 10 Drawing Sheets

400
408
Expansion Chamber 402a
Convergent-Divergent Nozzle 404a
Convergent-Divergent Nozzle 404b
Structural Body 412
Convergent-Divergent Nozzle 404c
Convergent-Divergent Nozzle 404n
Expansion Chamber 402b
Gas Separation Component 406
410

Related U.S. Application Data

(60) Provisional application No. 62/958,451, filed on Jan. 8, 2020, provisional application No. 63/009,819, filed on Apr. 14, 2020.

(51) Int. Cl.

| | |
|---|---|
| *A23L 2/56* | (2006.01) |
| *B01D 19/00* | (2006.01) |
| *B03C 1/023* | (2006.01) |
| *C02F 1/00* | (2023.01) |
| *C02F 1/20* | (2023.01) |
| *C12C 7/04* | (2006.01) |
| *C12C 7/28* | (2006.01) |
| *C12H 1/16* | (2006.01) |

(52) U.S. Cl.
CPC .......... *B01D 19/0063* (2013.01); *B03C 1/023* (2013.01); *C02F 1/20* (2013.01); *C02F 1/481* (2013.01); *C12C 7/04* (2013.01); *C12C 7/28* (2013.01); *C02F 2301/028* (2013.01)

(58) Field of Classification Search
CPC ...... C02F 1/481; C02F 2301/028; C12C 7/04; C12C 7/28

USPC .......... 426/592, 67; 123/538, 539; 210/222, 210/223, 695, 132, 446; 335/284, 305, 335/302, 306

See application file for complete search history.

(56) References Cited

U.S. PATENT DOCUMENTS

| | | | |
|---|---|---|---|
| 2009/0159523 A1* | 6/2009 | McCutchen | ............ C02F 1/001 |
| | | | 210/360.1 |
| 2010/0202247 A1* | 8/2010 | Pan | ......................... C02F 1/005 |
| | | | 366/261 |
| 2011/0240524 A1 | 10/2011 | Fenton | |

OTHER PUBLICATIONS

Supergrump, Magnetized water?, May 22, 2023, https:www.homebrewtalk.com/threads/magnetized-water 412243 (Year 2013).

* cited by examiner

500

508

502

$d_1$

504

506

$d_2$

510

600

602

604

606

608

700a

700b

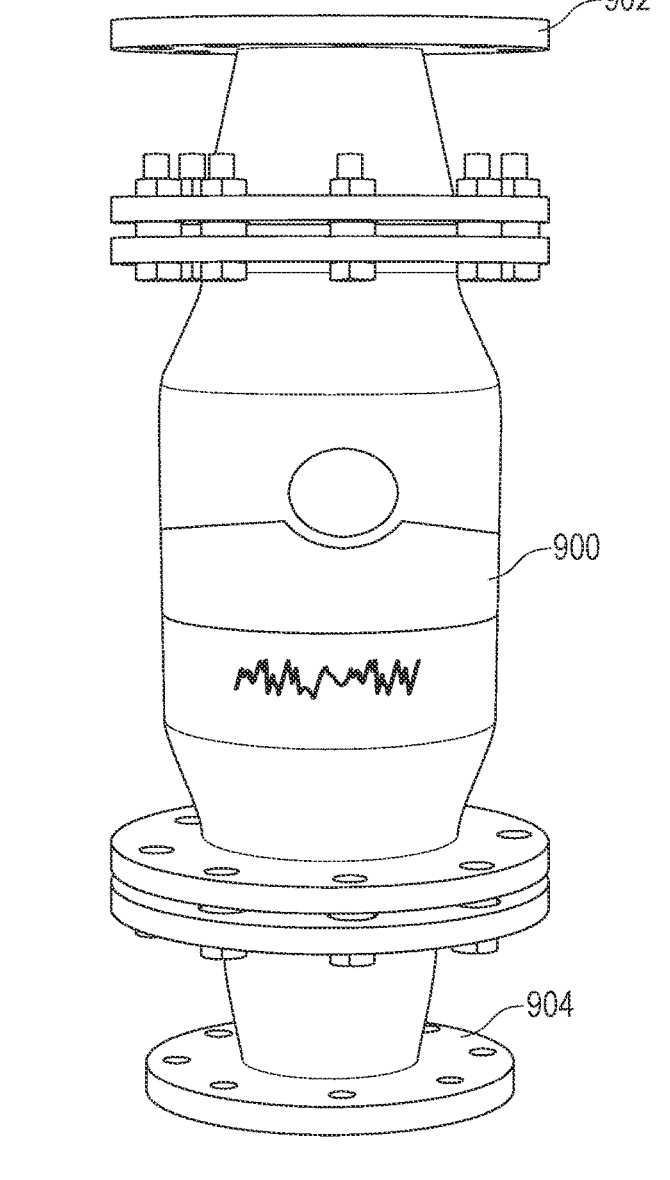
FIG. 9A          FIG. 9B

Figure 10:
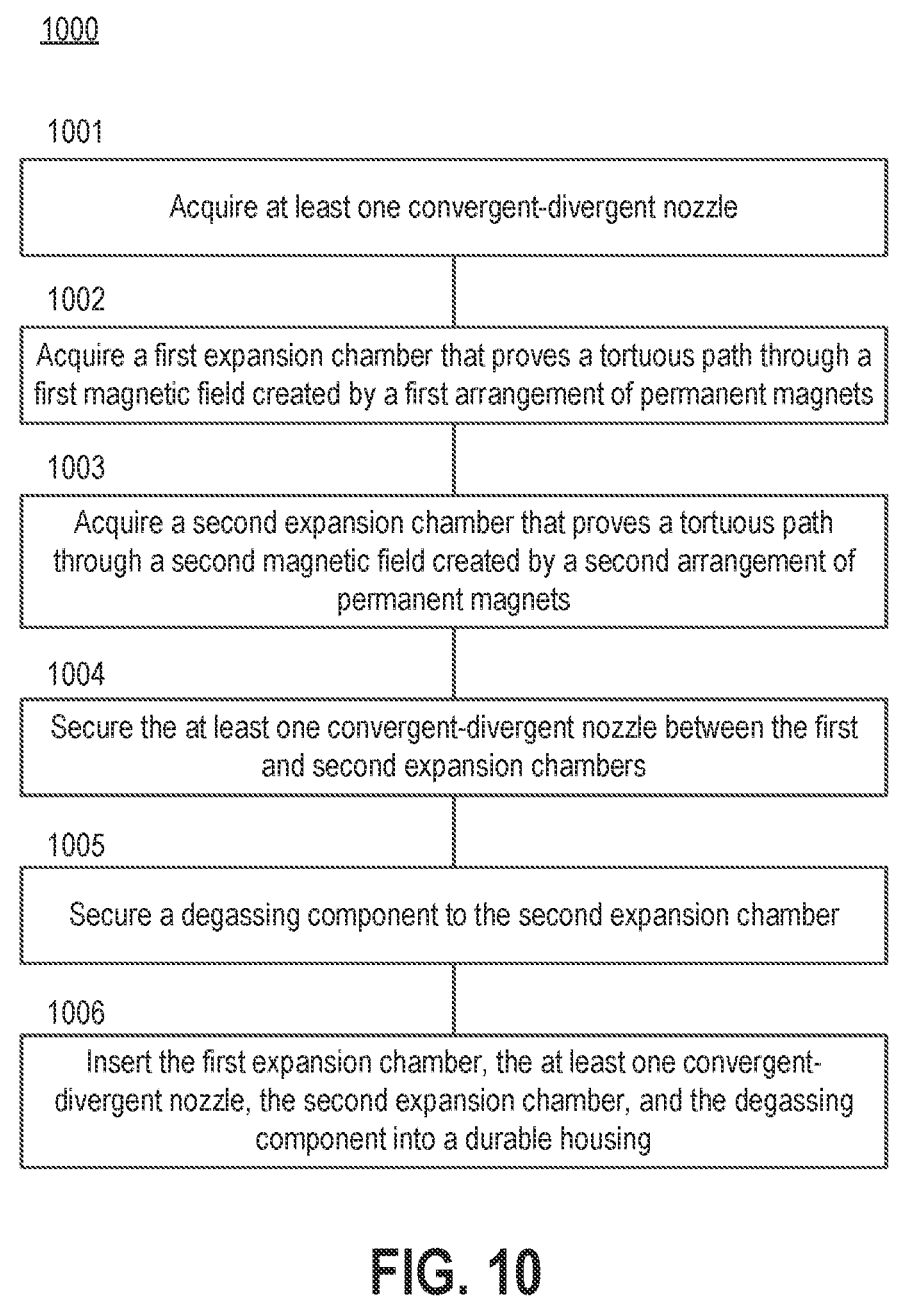

1000

1001

Acquire at least one convergent-divergent nozzle

1002

Acquire a first expansion chamber that proves a tortuous path through a first magnetic field created by a first arrangement of permanent magnets

1003

Acquire a second expansion chamber that proves a tortuous path through a second magnetic field created by a second arrangement of permanent magnets

1004

Secure the at least one convergent-divergent nozzle between the first and second expansion chambers

1005

Secure a degassing component to the second expansion chamber

1006

Insert the first expansion chamber, the at least one convergent-divergent nozzle, the second expansion chamber, and the degassing component into a durable housing

Obtain a hydromagnetic resonator

1102

Direct a volume of fluid through the hydromagnetic resonator

1103

Supply a series of containers

1104

Fill each container in the series of containers with alcoholic beverage that is produced using the volume of fluid

1105

Affix a lid to each container in the series of containers

MAGNETIC TREATMENT OF FLUIDS TO BE USED IN THE PRODUCTION OF ALCOHOLIC BEVERAGES WITH HYDROMAGNETIC RESONATORS

CROSS-REFERENCE TO RELATED APPLICATIONS

This application is a continuation of U.S. application Ser. No. 17/144,417, titled "MAGNETIC TREATMENT OF FLUIDS TO BE USED IN THE PRODUCTION OF ALCO-HOLIC BEVERAGES WITH HYDROMAGNETIC RESONATORS" and filed on Jan. 8, 2021, which claims priority to U.S. Provisional Application No. 62/958,451, titled "MAGNETIC TREATMENT PROCESS FOR PRO-DUCING ALCOHOLIC BEVERAGES" and filed on Jan. 8, 2020, and U.S. Provisional Application No. 63/009,819, titled "MAGNETIC TREATMENT PROCESS FOR PRO-DUCING ALCOHOLIC BEVERAGES" and filed on Apr. 14, 2020, each of which is incorporated by reference in its entirety.

TECHNICAL FIELD

Various embodiments concern treatment systems designed to treat fluids using magnetic fields and associated processes.

BACKGROUND

An alcoholic beverage is any fermented liquid that contains ethyl alcohol ($CH_3CH_2OH$) as an intoxicating agent. Examples of alcoholic beverages include beer and distilled spirits. Normally, ethyl alcohol (or simply "ethanol") is produced by fermenting the sugars contained in grains, fruits, and other ingredients (e.g., saps, tubers, honey, milk) and then reducing the fairly viscous liquid into one with a much greater ethanol concentration (and thus alcoholic strength). Alcoholic beverages are typically divided into three classes—beer, wine, and spirits—whose alcohol content can vary from less than 2 percent to more than 50 percent.

Beer is arguably the most widely known fermented drink. Beer is a member of the malt family of alcoholic beverages, which also includes ale, stout, porter, and malt liquor. The basic ingredients of beer are (i) water, (ii) a starch source (or simply "starch") that can be fermented, (iii) a yeast to initiate fermentation, and (iv) a flavoring to offset the starch. The most widely used starches are cereal grains such as barley, while less widely used starches include millet, sorghum, cassava, and agave. Sometimes, a mixture of starches is created by adding one or more adjuncts as supplements to the main starch. While this is often done to cut costs, the addition of adjuncts can also provide value, for example, by providing better foam retention, flavor, or nutritional value. Examples of adjusts include corn, rice, and sugar.

Wine is made by fermenting fruits such as grapes, apples, cherries, berries, and pumps. Winemaking begins with harvesting and crushing the fruit to release the juice (referred to as "must") that is then fermented under rigorous temperature control. When fermentation is complete, the mixture is filtered, aged, and then bottled.

Spirits, meanwhile, begin with the mashes of grains, fruits, or other ingredients. The resultant fermented liquid is then heated until the alcohol and flavorings vaporize and can be drawn, cooled, and condensed into a concentrated liquid. This concentrated liquid (referred to as a "distilled beverage") normally has an alcohol content that ranges from 35 percent to 50 percent, though higher and lower concentrations are not uncommon. Examples of spirits include whiskey, gin, vodka, rum, and brandy.

BRIEF DESCRIPTION OF THE DRAWINGS

FIG. 9A depicts an example of a hydromagnetic resonator having a wide form.

FIG. 9B illustrates how the hydromagnetic resonator of FIG. 9A may be connected between an ingress pipe through which untreated fluid is received and an egress pipe through which treated fluid is ejected.

FIG. 10 depicts a flow diagram of a process for constructing a hydromagnetic resonator designed to magnetically treat fluid flowing therethrough.

Figure 1:
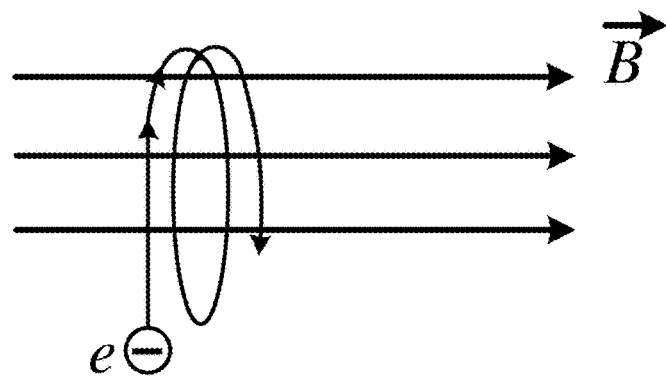
FIG. 1 illustrates how if a charged particle were to move in a magnetic field perpendicular to the direction of the induction vector, then the charged particle will move along a circular path.

Various features of the technology described herein will become more apparent to those skilled in the art from a study of the present disclosure in conjunction with the drawings. Embodiments are illustrated by way of example and not limitation in the drawings. Accordingly, while several embodiments have been shown in the drawings for the purpose of illustration, those skilled in the art will recognize that alternative embodiments may be employed without departing from the principles of the technology.

DETAILED DESCRIPTION

Charged particles that are present in a fluid will be acted upon if the fluid moves in a magnetic field. The Lorentz force (also referred to as the "electromagnetic force") is the combination of magnetic forces that acts on each of these charged particles. A charged particle moving with velocity in a magnetic field will experience a Lorentz force of:

$$F=qV\times B,$$

<div align="right">Eq. 1</div> where q is the electric charge of the particle, V is the velocity vector of the particle, and B is the induction vector of the magnetic field. The Lorentz force is perpendicular to the motion of the charged particle and the direction of the magnetic field.

The trajectory of a charged particle in a magnetic field can be represented as follows:

$$\vec{F}=q[\vec{v}\times\vec{B}]=qvB \sin \propto. \qquad \text{Eq. 2}$$

As shown in FIG. 1, if a charged particle were to move in a magnetic field perpendicular to the direction of the induction vector, then the charged particle will move along a circular path. If the charged particle were to move at an angle with respect to the induction vector, then the charged particle will move along a spiral path. This may occur if, for example, the fluid conveying the charged particle is moving with respect to the induction vector. Note, however, that if the fluid conveying the charged particle is halted, then the magnetic field will no longer interact with the charged particle.

At certain values of velocity and induction, the structure of a fluid will change as it moves through a magnetic field due to the occurrence of phenomena such as phase transitions. These phenomena may be initiated by, for example, magnetostriction. Magnetostriction is a property of magnetic materials that causes them to change their shape, dimensions, or density during the process of magnetization. The variation of a given material's magnetization due to a magnetic field will change the magnetostrictive strain until reaching a saturation value.

Introduced here are treatment systems and associated processes for treating fluids to be used in the production of alcoholic beverages using magnetic fields. By rearranging the larger clusters of molecules that are present in the fluid into smaller (and more uniformly sized) clusters of molecules, the technologies exhibits several benefits. For example, decreasing the size of clusters of molecules may naturally promote adsorption-leading to improved hydration-without additives, chemicals, and the like. As another example, decreasing the size of clusters of molecules may lead to more efficient interactions on a molecular level. Thus, alcoholic beverages could be produced in a more efficient manner as further discussed below.

A treatment system can comprise a hydromagnetic resonator (also referred to as a "hydromagnetic device" or "magnetic device") that creates the magnetic fields through which fluid can be directed. A hydromagnetic resonator can include at least one expansion chamber that provides a tortuous path along which fluid is able to flow through a magnetic field created by an arrangement of permanent magnets and at least one convergent-divergent nozzle designed to accelerate the flow of fluid passing through a throat segment. As further discussed below, fluid directed through a hydromagnetic resonator will be magnetically treated while flowing through the magnetic field created by the arrangement of permanent magnets within each expansion chamber and then pressurized while flowing through the throat segment of each convergent-divergent nozzle. In some embodiments, the hydromagnetic resonator includes a degassing component that is responsible for removing at least some gas (e.g., air) from the fluid prior to egress from the hydromagnetic resonator.

Several approaches to treating fluids used in the production of alcoholic beverages are discussed below. Examples of fluids include air, water, mash, wort, alcohol vapor, and alcoholic beverage (e.g., distillate). At a high level, these fluids may be thought of as solutions comprised of electrically charged molecules that are arranged at random. These molecules interact with one another to form clusters of different sizes and compositions. Each molecule in a cluster will experience thermal motion, however. Consequently, there is a possibility that a given molecule will leave its cluster when its Coulomb force with respect to the nearest neighboring molecules is insignificant. For similar reasons, the Coulomb force may cause free molecules to join the nearest cluster. There is a dynamic equilibrium between clusters as molecules are constantly exchanged. Generally, each molecule will oscillate around its equilibrium position with a given frequency. If fluid is moved through an electromagnetic field, the resulting Lorentz force will tend to change the trajectory of the clusters of its molecules.

We'll start by changing the vector indicative of the Lorentz force with a certain frequency by tuning (i) the magnetic field and (ii) the velocity of the fluid (and thus the clusters of its molecules) as it travels through the magnetic field. As further discussed below, the velocity may be tuned based on a characteristic of the fluid. For instance, the velocity may be based on the viscosity or fluidity of the fluid, or the velocity may be based on the saturation of the fluid to various substances, minerals, etc. Thus, different fluids may be delivered through the magnetic field produced by a hydromagnetic resonator at different velocities.

When the frequency of an external force acting on a molecule is resonant to its natural frequency, the molecule will deviate from its equilibrium position by an amount that exceeds the critical distance. The term "critical distance" refers to the distance at which the force of an interaction will no longer keep the molecule in its cluster.

By tuning these parameters, the distribution and size of clusters in the fluid can be changed. Such action will alter the entropy (i.e., structure) of the fluid. Other thermophysical properties may also be altered as further discussed below. Thus, the structure of a fluid can be altered using a relatively small amount of energy provided by an arrangement of permanent magnets that create a magnetic field. This can be accomplished with a second-order phase transition (also referred to as a "second-kind phase transition") that alters the structure of the fluid without changing its aggregate state.

Terminology

References in this description to "an embodiment," "one embodiment," or "some embodiments" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise," "comprising," and "comprised of" are to be construed in an inclusive sense rather than an exclusive or exhaustive sense (i.e., in the sense of "including but not limited to"). The term "based on" is also to be construed in an inclusive sense rather than an exclusive or exhaustive sense. Thus, unless otherwise noted, the term "based on" is intended to mean "based at least in part on."

When used in reference to a list of multiple items, the word "or" is intended to cover all of the following interpretations: any of the items in the list, all of the items in the list, and any combination of items in the list.

The sequences of steps performed in any of the processes described here are exemplary. However, unless contrary to physical possibility, the steps may be performed in various sequences and combinations. For example, steps could be added to, or removed from, the processes described here. Similarly, steps could be replaced or reordered. Thus, descriptions of any processes are intended to be open-ended.

Overview of Brewing Process

Figure 2:
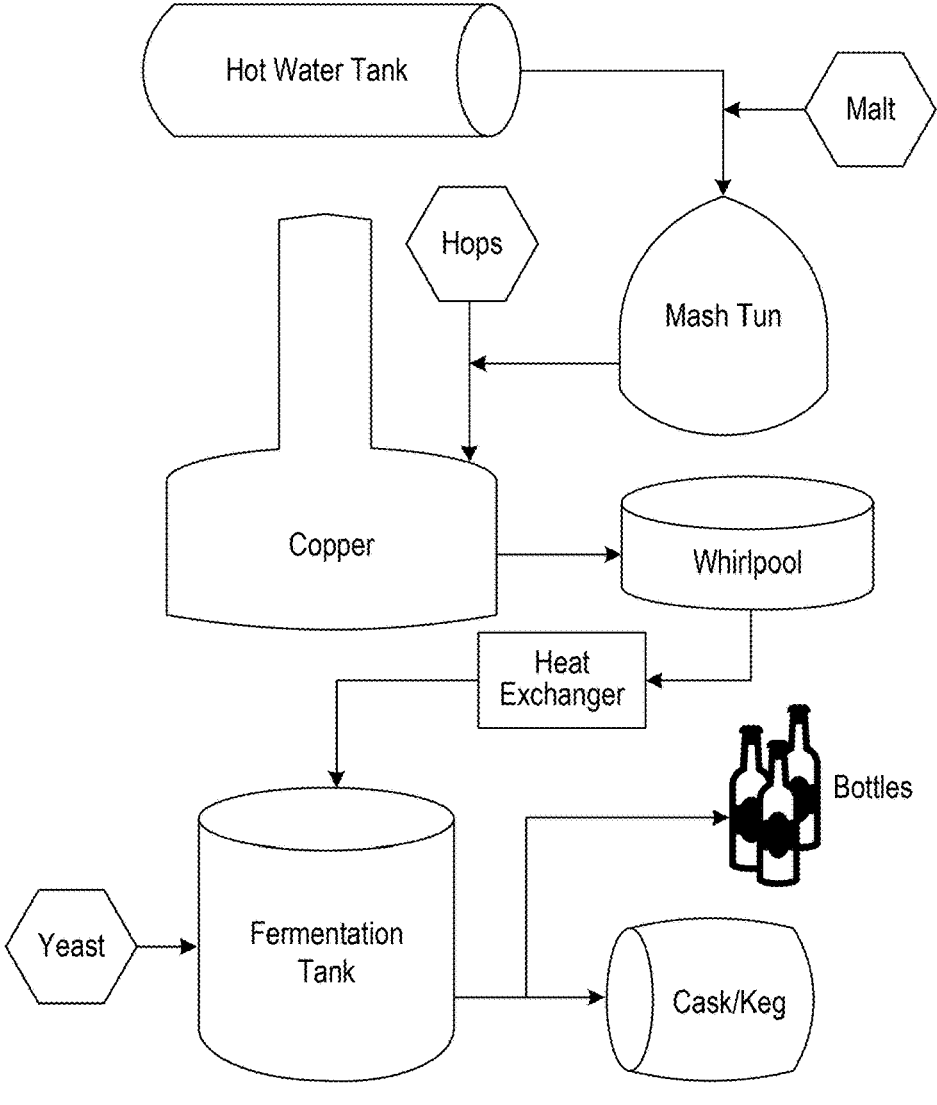
FIG. 2 includes a high-level illustration of a brewing process for producing beer.

FIG. 2 includes a high-level illustration of a brewing process for producing beer. As shown in FIG. 2, the brewing process can include various steps such as malting, mashing, lautering, boiling, fermenting, conditioning, filtering, and packaging. Malting is the process by which a grain (e.g., barley) is made ready for brewing. Malting may be broken down in to three steps (i.e., steeping, germinating, and kilning) that, when performed in sequence, release the starches in the grain. First, the grain may be added to a vat with water where it is allowed to soak for approximately 40 hours. The grain is then spread on the floor of a germination room for approximately 5 days. Thereafter, the malt can be dried in a kiln with gradual increases in temperature over the course of several hours. Generally, the malt is milled or crushed after kilning is completed to improve the ease with which sugars can be extracted.

Mashing converts the starches released during malting into sugars that can be fermented. The malt is mixed with hot water in a vessel known as a mash tun. In this vessel, the milled grain and water form a cereal mash. Naturally occurring enzymes that are present in the malt convert the starches in the grain into simply sugars. This process (referred to as "saccharification") occurs between 140-158° Fahrenheit (60-70° Celsius). Mashing results in a sugar-rich liquid that is referred to as "wort," which is then strained through the bottom of the mash tun in a process known as lautering. Before lautering, the temperature of the mash may be raised to approximately 167-172° F. (75-78° C.) to free up more starch and reduce viscosity of the mash. Additional water could also be sprinkled onto the mash to extract additional sugars.

The wort is then moved into a tank known as a copper, where it is boiled with hops and, in some cases, other ingredients such as herbs or sugars. This is the stage at which many chemical reactions take place that affect the flavor, color, and aroma of the beer. The boiling process serves to terminate enzymatic processes, precipitate proteins, isomerize hop resins, and concentrate/sterilize the wort. At the end of the boil, the wort settles in a vessel known as a whirlpool, where the solid particles in the wort are separated out.

Then, the wort is drawn away from the whirlpool and rapidly cooled, for example, with a heat exchanger, to a temperature where yeast can be added. Brewers employ a variety of different heat exchangers, with the most common being plate heat exchangers that use metal plates to transfer heat from the wort to another fluid. For example, a liquid (e.g., water or glycol) may run along one side of a metal plate in the opposite direction of the wort, thereby causing a rapid drop in temperature. Generally, the wort is cooled to a temperature below 140° F. (60° C.) to prevent the yeast from dying.

The wort is then guided into a fermentation tank where yeast can be added. Fermentation will begin when the yeast is added to the wort. During fermentation, the sugars turn into alcohol, carbon dioxide, and other components. When fermentation is complete, the brewer may rack the beer into a vessel known as a conditioning tank. Conditioning is the process by which the beer ages. As the beer ages, the overall flavor will become smoother and unwanted flavors will dissipate. Beer may be conditioned anywhere from several days to several months. After conditioning, the beer may be filtered in preparation for loading into bottles, cans, casks, or kegs.

Overview of Distillation Process

Figure 3:
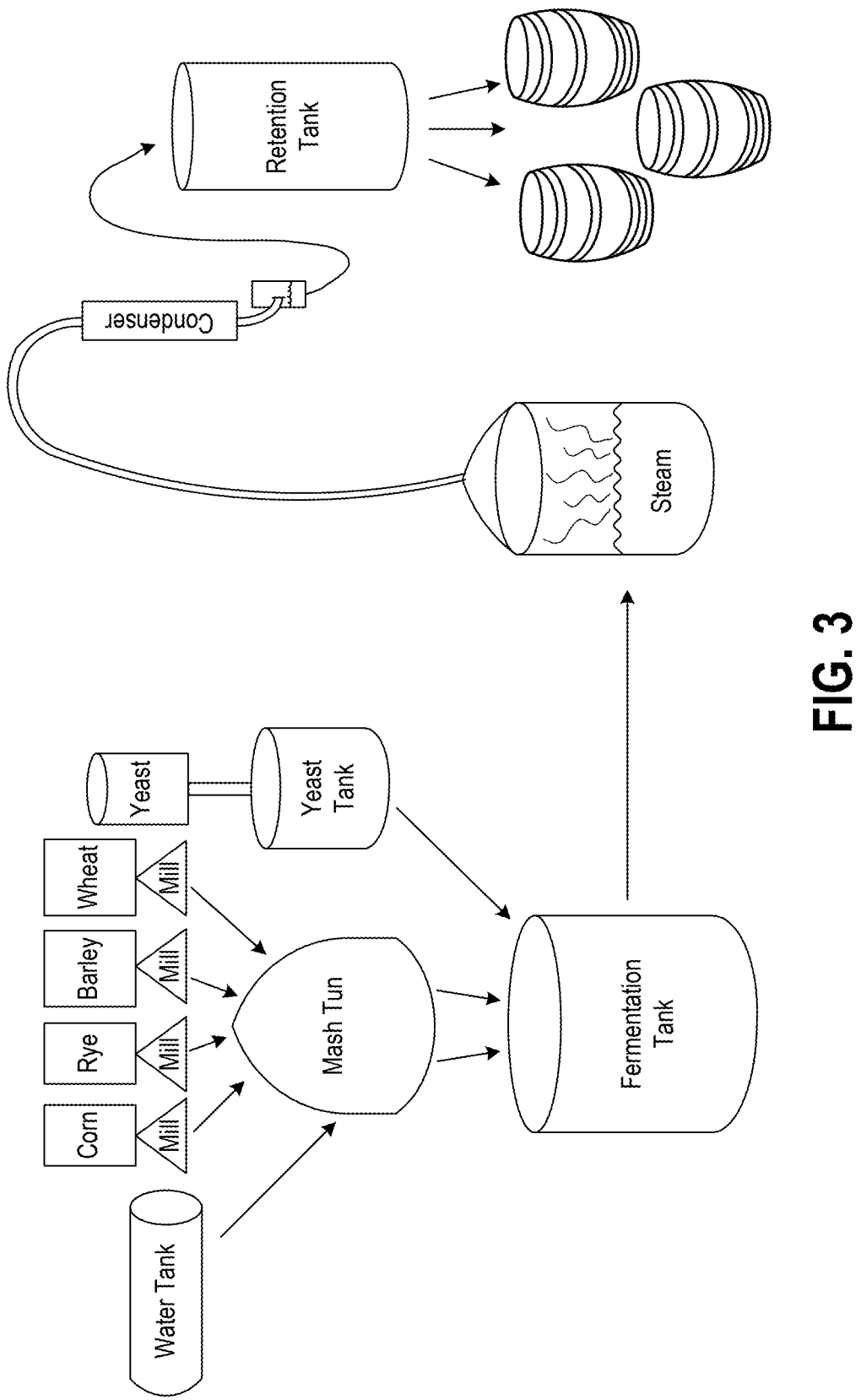
FIG. 3 includes a high-level illustration of a distillation process for producing spirits.

FIG. 3 includes a high-level illustration of a distillation process for producing spirits. Initially, a distiller will acquire loads of ingredients to be used to produce spirits. For example, if the distiller is interested in producing whiskey, then the ingredients may include corn, rye, wheat, and malted barley as shown in FIG. 3. As another example, if the distiller is interested in producing gun, then the ingredients may include wheat, malted barley, and botanicals such as juniper berries, coriander, citrus, peppercorns, cinnamon, and the like. Generally, these ingredients are milled or crushed to improve the ease with which sugars can be extracted before being added to a vessel known as a mash tun.

In the mash tun, the ingredients are combined with water to form a mash. Over time, naturally occurring enzymes convert the starches in the ingredients into simple sugars. This process (referred to as "saccharification") normally occurs between 140-158° Fahrenheit (60-70° Celsius). The mash can then be transferred to a fermentation tank, where yeast is added to initiate fermentation. Over the course of several days, the simple sugars turn into alcohol, carbon dioxide, and other components.

The fermented mixture can then be fed into a still that produces steam. Since alcohol vaporizes at a lower temperature than water, the alcohol will rise to the top of the still in vapor form. One or more tubes connected to the top of the still may redirect the alcohol vapors toward a retention tank via a condenser. Many distillers simply use cold water that runs alongside the tubes as the condenser; however, other options are available. This vaporization procedure may be performed multiple times in order to further purify the resulting alcohol (referred to as the "distillate"). Then, the distillate can be loaded into kegs or casks for aging, or the distillate can be loaded directly into bottles for transporting. To reduce the alcohol content, some distillers add water to the distillate prior to aging/bottling.

Overview of Hydromagnetic Resonator

Figure 4A:
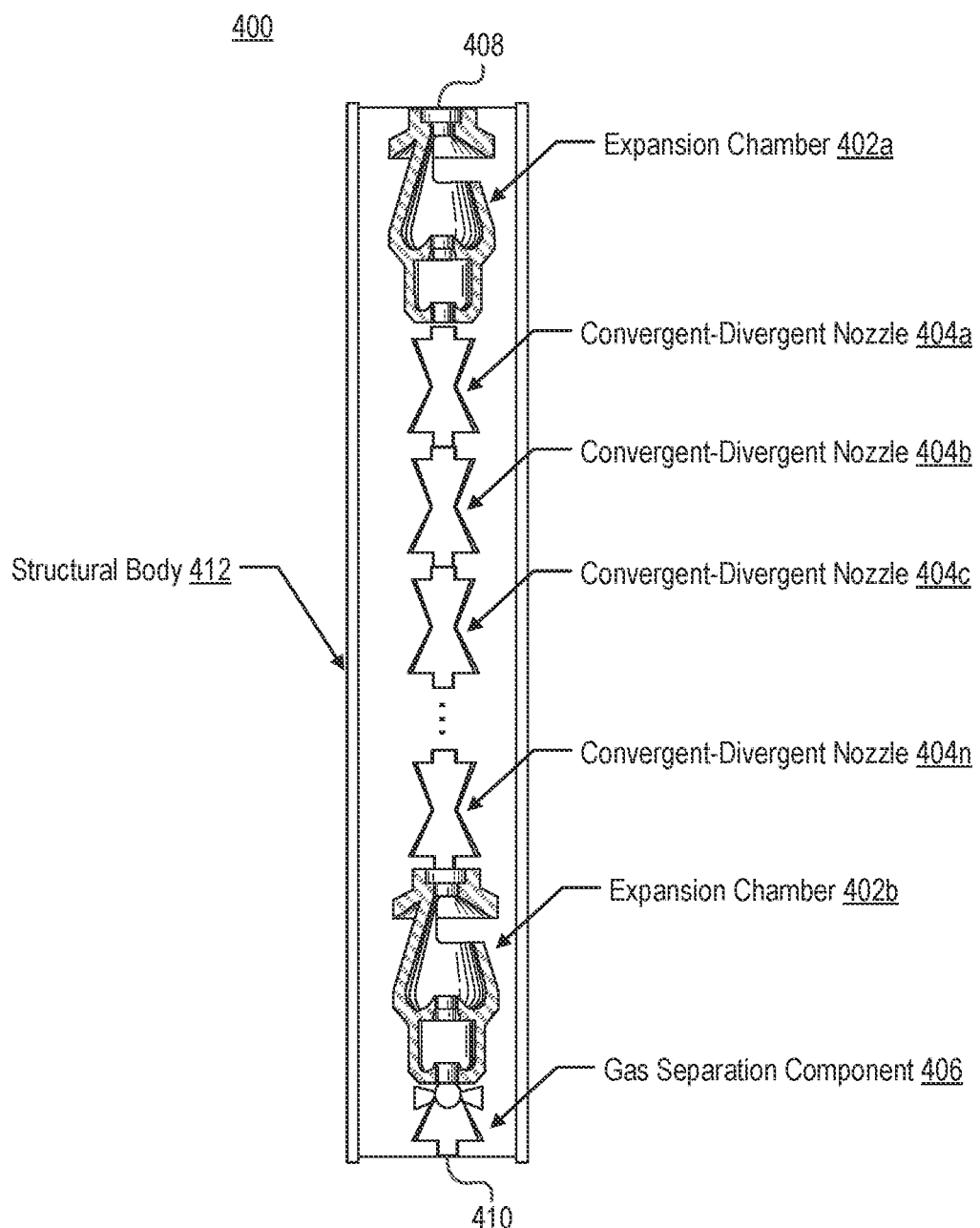
FIG. 4A illustrates an example of a hydromagnetic resonator that is capable of magnetically treating fluid
Figure 4B:
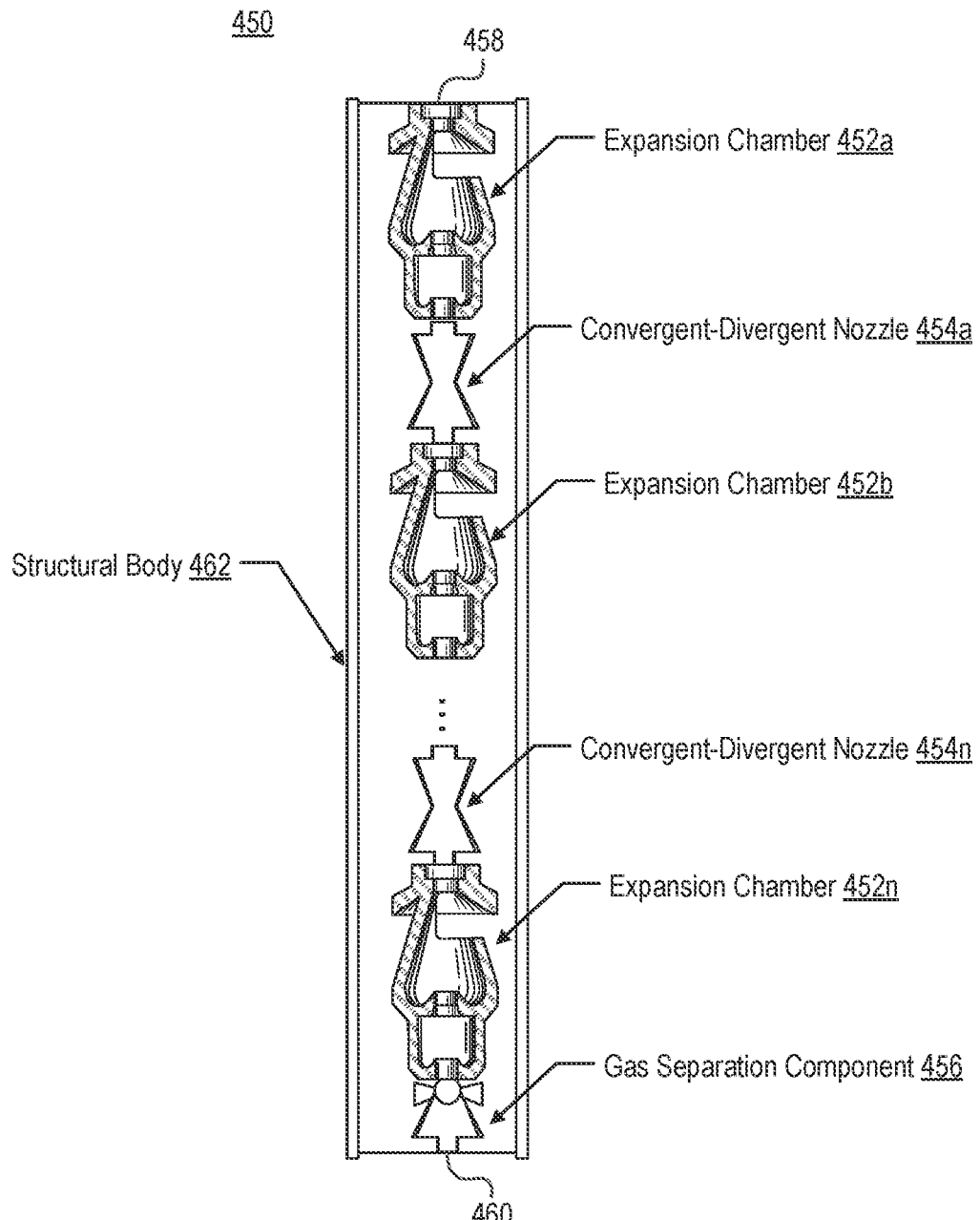
FIG. 4B illustrates another example of a hydromagnetic resonator that is capable of magnetically treating fluid.

FIG. 4A illustrates an example of a hydromagnetic resonator 400 that is capable of magnetically treating fluid, while FIG. 4B illustrates another example of a hydromagnetic resonator 450 that is capable of magnetically treating fluid. While embodiments may be described in the context of magnetically treating water, those skilled in the art will recognize that another fluid to be used in the production of alcoholic beverages could be directed through a hydromagnetic resonator. Examples of such fluids include air, water, mash, wort, alcohol vapor, and alcoholic beverage (e.g., distillate).

As shown in FIG. 4A, the hydromagnetic resonator 400 may include one or more convergent-divergent nozzles 404a-n that are arranged in series between a pair of expansion chambers 402a-b. In such a configuration, fluid received by the hydromagnetic resonator 400 through an ingress interface 408 is guided from a first expansion chamber 402a to a second expansion chamber 402b through the convergent-divergent nozzles 404a-n. Alternatively, the hydromagnetic resonator 450 may include multiple expansion chambers 452a-n and multiple convergent-divergent nozzles 454a-n that are alternatively arranged as shown in FIG. 4B. In such a configuration, fluid received by the hydromagnetic resonator 450 through an ingress interface 458 is guided through at least two pairs of expansion chambers and convergent-divergent nozzles.

In some embodiments, the hydromagnetic resonator 400, 450 includes a gas separation component 406, 456 designed to remove at least some gas from the fluid prior to being expelled from an egress interface 410, 460. The gas may be, for example, air. Some of this gas may be introduced into the fluid as it jostles itself traveling through the expansion chambers 402a-b, 452a-n or the convergent-divergent nozzles 404a-n, 454a-n. Examples of gas separation components include relief valves and degassing chambers, such as vacuum chambers. The type of gas separation component included in a given hydromagnetic resonator may depend on factors such as the amount of gas to be removed from the fluid and the speed with which the gas is to be removed from the fluid. This speed may correspond to the speed with which the fluid is traveling through the hydromagnetic resonator.

The expansion chambers, convergent-divergent nozzles, and gas separation component may be installed within a structural body 412, 462. The structural body (also referred to as a "durable housing") 412, 462 may be a hollow cylinder (also referred to as a "sleeve") that is comprised of metal, ceramic, or plastic. The structural body 412, 462 may enable the hydromagnetic resonator 400, 450 to be easily installed within a brewing system or distilling system. For example, the structural body 412, 462 may include a first threaded end at the ingress interface 408, 458 and/or a second threaded end at the egress interface 410, 460. Generally, the first threaded end engages a first pipe through which fluid is supplied to the hydromagnetic resonator 400, 450 while the second threaded end engages a second pipe though which fluid is expelled from the hydromagnetic resonator 400, 450. Thus, the second pipe may carry fluid from the hydromagnetic resonator 400, 450 toward a next component in the brewing process or distilling process.

Figure 5:
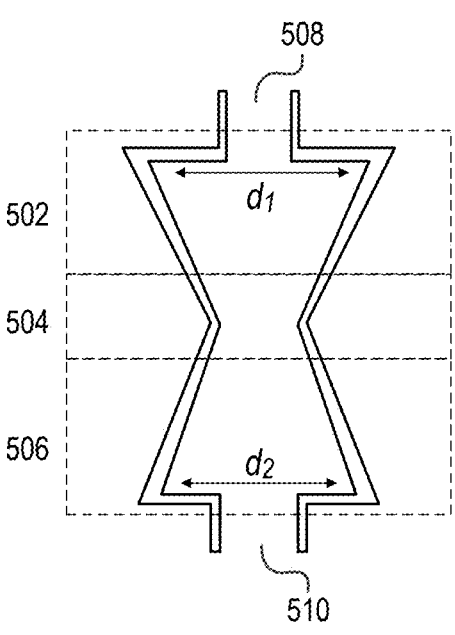
FIG. 5 illustrates how a convergent-divergent nozzle (also referred to as a "de Laval nozzle") may be designed to accelerate the flow of fluid as it passes from an inlet segment to an expansion segment through a throat segment.

FIG. 5 illustrates how a convergent-divergent nozzle (also referred to as a "de Laval nozzle") 500 may be designed to accelerate the flow of fluid as it passes from an inlet segment 502 to an expansion segment 506 through a throat segment 504. At a high level, the convergent-divergent nozzle 500 is a tube that is pinched in the middle so that fluid passing through it is accelerated in the axial direction. While the throat segment 504 is centrally located along the length of the convergent-divergent nozzle 500, the throat segment 504 may not be equidistant between the ingress interface 508 through which fluid is received and the egress interface 510 through which fluid is ejected. Instead, the convergent-divergent nozzle 500 normally has an hourglass shape because the throat segment 504 is slightly nearer the ingress interface 508 than the egress interface 510 and the diameter $(d_2)$ of the expansion segment 506 is slightly larger than the diameter $(d_1)$ of the inlet segment 502.

In the throat segment 504 where the cross-sectional area is at its minimum, the velocity of the fluid will increase-a condition referred to as "choked flow." As the cross-sectional area increases in the expansion segment 506, the fluid will begin to expand. In order for the fluid to "choke" at the throat segment 504, the pressure and flow through the convergent-divergent nozzle 500 must be sufficiently high. Accordingly, the pressure of the fluid entering the convergent-divergent nozzle 500 may be above the ambient pressure.

As discussed above, the number of convergent-divergent nozzles included in a hydromagnetic resonator may vary. For example, some embodiments of hydromagnetic resonator include a single convergent-divergent nozzle arranged between a pair of expansion chambers, while other embodiments of hydromagnetic resonator include multiple convergent-divergent nozzles (e.g., 3, 5, or 7) arranged in series between a pair of expansion chambers. Alternatively, convergent-divergent nozzles could be alternatively arranged with expansion chambers as shown in FIG. 4B.

The thickness of the wall defining the inlet segment 502, throat segment 504, and expansion segment 506 may be based on the pressure of the fluid inside each segment. As such, the thicknesses may vary based on characteristics of the fluid (e.g., its type, viscosity, temperature, etc.), the flow rate, etc. Meanwhile, in the central portions of the inlet and expansion segments 502, 506, micro-cluster explosions will occur as discussed above. Accordingly, degassing may occur within the convergent-divergent nozzle 500 as gasses dissolved within the fluid are released.

Within the convergent-divergent nozzle 500, magnetic induction may increase in the flow direction. For instance, the magnetic induction may be 45-60 millitesla near the entrance of the inlet segment 502 and 120 millitesla near the throat segment 504. Consequently, there may be constant spasmodic variation in magnetic induction as fluid travels through a hydromagnetic resonator. This may greatly enhance the effect of magnetostriction.

Figure 6:
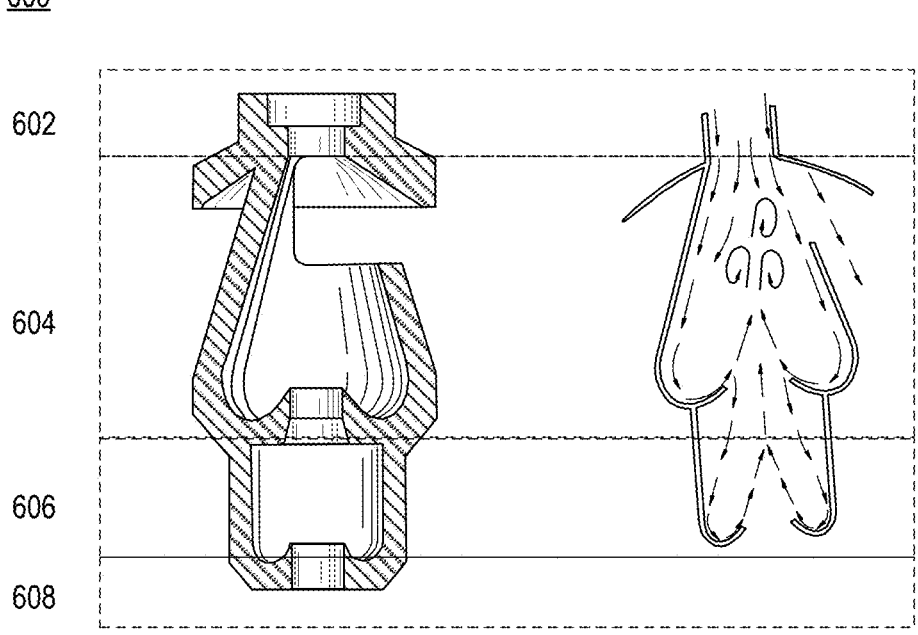
FIG. 6 illustrates how an expansion chamber can provide a tortuous path along which fluid is able to flow through a magnetic field created by an arrangement of permanent magnets.

FIG. 6 illustrates how an expansion chamber 600 can provide a tortuous path along which fluid is able to flow through a magnetic field created by an arrangement of permanent magnets. As shown in FIG. 6, the expansion chamber 600 may include an inlet segment 602, a primary expansion segment 604, a secondary expansion segment 606, and an outlet segment 608. As shown in FIG. 6, these segments define the tortuous path along which fluid will travel as it flows through the expansion chamber 600.

Because the expansion chamber includes an arrangement of permanent magnets that creates a magnetic field, the fluid will be magnetically treated as it travels along this tortuous path. Note, however, that the expansion chambers included in a hydromagnetic resonator do not necessarily need to include identical arrangements of permanent magnets. For instance, a hydromagnetic resonator may include a first expansion chamber that provides a first tortuous path through a first magnetic field created by a first arrangement of permanent magnets and a second expansion chamber that provides a second tortuous path through a second magnetic field created by a second arrangement of permanent magnets different than the first arrangement of permanent magnets. Each arrangement of permanent magnets may be designed based on the desired magnetic field, which may in turn be based on the fluid to be treated, the speed of the fluid, the pressure of the fluid, etc. Accordingly, an expansion chamber included in a hydromagnetic resonator that is responsible for treating water may include a different arrangement of permanent magnets than an expansion chamber included in a hydromagnetic resonator that is responsible for treating wort or mash.

One or more blades may be located near the inlet segment 602 and/or the outlet segment 608 to ensure that fluid travels in a particular direction as it travels through the expansion chamber 600. These blade(s) may be designed to ensure that the fluid travels in a clockwise direction with respect to the median plane that divides the expansion chamber 600 lengthwise. In some embodiments, the blade(s) are integrally formed within the inlet segment 602 and/or the outlet segment 608 of the expansion chamber 600. Alternatively, these blade(s) may be part of a separate component that is secured, for example, to the inlet segment 602 of the expansion chamber 600.

Figure 7:
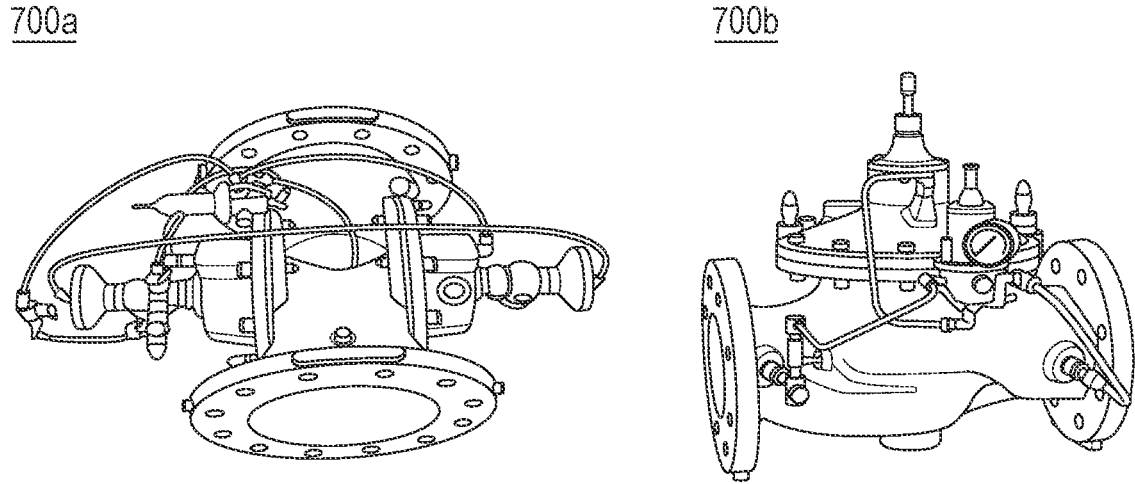
FIG. 7 depicts several examples of degassing components (also referred to as "gas separation components") able to remove at least some gas from the fluid as it travels through a hydromagnetic resonator.

FIG. 7 depicts several examples of degassing components (also referred to as "gas separation components") 700a-b able to remove at least some gas from the fluid as it travels through a hydromagnetic resonator. As discussed above, micro-cluster explosions that create gas may occur as the fluid travels through a convergent-divergent nozzle (e.g., convergent-divergent nozzle 500 of FIG. 5), and a degassing component may be useful in removing at least some of this gas before the fluid is expelled from the hydromagnetic resonator. Normally, a single degassing component is located near the egress interface of the hydromagnetic resonator as shown in FIGS. 4A-B. However, some embodiments of the hydromagnetic resonator include multiple degassing components. For example, degassing components could be interspersed in the alternating series of expansion chambers and convergent-divergent nozzles shown in FIG. 4B.

One example of a degassing component is a gas relief valve (also referred to as a "pressure relief valve" or "relief valve") designed to protect against overpressure by discharging pressurized gases through an auxiliary passage out of the hydromagnetic resonator. Generally, the relief valve is designed to open at a predetermined pressure to protect downstream components from being subjected to pressures that exceed their design limits. When this pressure is exceeded, the relieve valve becomes the "path of least resistance" as the valve is forced open and gas is diverted through the auxiliary route. Another example of a degassing component is a degassing chamber, such as a vacuum chamber, that is connected to a vacuum pump able to remove gas from fluid in the chamber. The chamber may be sealed with a lid comprised of a shatter-resistant material and rubber gasket that collectively create an air-tight seal for maximum vacuum.

FIGS. 8A-B and 9A-B depict examples of hydromagnetic resonators having different form factors. As discussed above, these hydromagnetic resonators can be deployed as in-line systems capable of treating fluid as it travels from a source to a destination. For example, a hydromagnetic resonator may be deployed to treat water before it is deposited into a mash tun, or a hydromagnetic resonator may be deployed to treat mash before it is deposited into a copper.

Figure 8A:
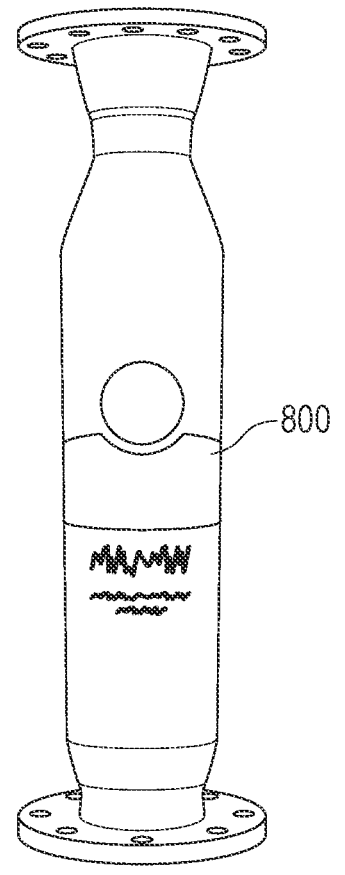
FIG. 8A depicts an example of a hydromagnetic resonator having a narrow form.
Figure 8B:
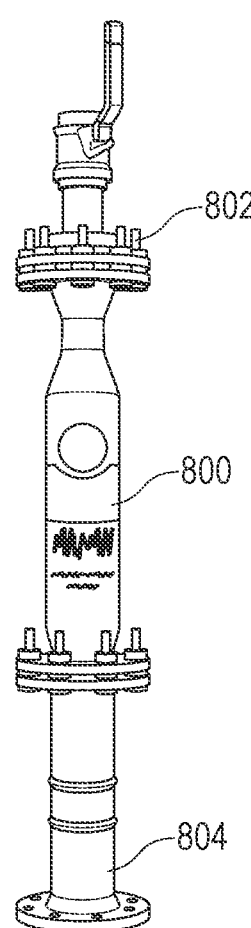
FIG. 8B illustrates how the hydromagnetic resonator of FIG. 8A may be connected between an ingress pipe through which untreated fluid is received and an egress pipe through which treated fluid is ejected.

Here, FIG. 8A depicts an example of a hydromagnetic resonator 800 having a narrow form, while FIG. 8B illustrates how the hydromagnetic resonator 800 may be connected between an ingress pipe 802 through which untreated fluid is received and an egress pipe 804 through which treated fluid is ejected. FIG. 9A, meanwhile, depicts an example of a hydromagnetic resonator 900 having a wide form, while FIG. 9B illustrates how the hydromagnetic resonator 900 may be connected between an ingress pipe 902 through which untreated fluid is received and an egress pipe 904 through which treated fluid is ejected. The term "narrow form" may refer to hydromagnetic resonators having a diameter less than 6 inches, while the term "wide form" may refer to hydromagnetic resonators having a diameter greater than 6 inches. Generally the diameter of the hydromagnetic resonator is 4-8 inches, though the diameter may be based on the volume of fluid to be handled per unit time (e.g., per minute). The term "pipe" can refer to any tubular structure capable of conveying a fluid. Generally, pipes are comprised of metal, plastic, or some other non-degradable material that is unlikely to contaminate the fluid flowing therethrough.

The hydromagnetic resonator (and the other components shown in FIGS. 8B and 9B) may be designed based on how the treated fluid will be used. For example, an installer may choose which hydromagnetic resonator should be employed based on the size of the pipeline responsible for delivering fluid for treatment. Moreover, the form of a hydromagnetic resonator may depend on the volume, pressure, or temperature of fluid to be treated. For example, hydromagnetic resonators designed to treat smaller volumes of fluid on a per-minute basis may have a narrower form than hydromagnetic resonators designed to treat larger volumes of fluids on a per-minute basis, as shown in FIGS. 8A-B and 9A-B respectively. As another example, a distiller who intends to sell spirits to be treated prior to bottling may employ a different hydromagnetic resonator than a brewer who intends to use treated water to be used in the production of beer. Distillers and brewers may collectively be referred to as "producers" of alcoholic beverages.

Degassing Via Magnetic Field

Fluids in contact with atmospheric air represents an open nonhomogeneous system in which the atmospheric air will dissolve in the fluid in an inconsistent manner. Part of the dissolved air will form a colloid of microbubbles in the fluid. These bubbles are thermodynamically metastable due to the adsorption of ions on their surface. Generally, these bubbles are formed as temperature fluctuations affect the density of the fluid. The hydrophobicity of the atmospheric air creates high surface tension and Laplace pressure, and the adsorption of ions creates a back pressure that stabilizes the size of the bubbles. Ultimately, the bubbles may act as traps for ions suspended in the fluid.

The basic properties of a fluid can be altered through degassing as a result of magnetic treatment as discussed above. When fluid is passed through a hydromagnetic resonator (e.g., hydromagnetic resonators 400, 450 of FIGS. 4A-B), instantaneous degassing will occur. Such degassing will lead to a second-order phase transition that alters properties of the fluid. For instance, fluid may experience:

A decrease in viscosity by 3-4%;

An increase in surface tension by 10-13%;

An increase in electrical conductivity by 7-26%;

An increase in specific heat capacity by 3-4%;

An increase in latent heat of vaporization by 10-40%;

An increase in magnetic susceptibility by 200-400%; and/or.

A decrease in pathogenic bacteria activity by 2-4 times.

These alterations can have a meaningful impact on the production of alcoholic beverages.

For example, to reduce the amount of time that it takes to produce beer, a hydromagnetic resonator may be installed on some or all of the following processes:

Water Treatment—The water supplied by a municipal authority to a brewer could be treated upon acquisition. For example, a hydromagnetic resonator may be affixed to the pipe through which water enters a brewing facility. However, other options are also possible. For example, water obtained from a well that is owned and/or operated by the brewer could be treated upon acquisition.

Malting—Grain can be soaked in water that has been magnetically treated. This may reduce the time needed for soaking and germinating by 30-50%. To accomplish this, a hydromagnetic resonator may be installed on the pipe that delivers water to the vat.

Drying—Some brewers dry the malt to inhibit development of sprouts when enzymes are activated. This also serves to increase the shelf life of the malt. The temperature at which drying is carried out can affect the color, taste, and smell of the malt. A hydromagnetic resonator may be installed on the drying system responsible for introducing a warm flow of air to the malt. Such action may reduce the duration of the drying process by 40-50%.

Mashing—As discussed above, mashing occurs in a mash tun where malt and water are mixed at a certain temperature. This activates the enzymes in the malt, which causes the starches to form sugars. Mashing causes the malt to acquire a sweet taste. There are two approaches to mashing, namely, infusing and boiling.

Infusing—In this approach, the mash is infused with heat and then kept at a certain temperature for intervals of time that vary depending on the recipe. If the malt is mixed with water that has been magnetically treated, the duration of the mashing process may be reduced by more than 50%. To accomplish this, a hydromagnetic resonator may be installed on the pipe that delivers water to the mash tun.

Boiling—Many brewers of lagers opt for the boiling approach instead of the infusing approach. This approach requires a pair of mash tuns. While the same biochemical processes take place as in the infusing approach, parts of the mash are periodically poured from the first mash tun into the second mash tun, brought to a boil, and then returned to the first mash tun. This is done to raise the temperature to prompt activation of enzymes in the first mash tun. While magnetic treatment is generally not performed as the mash is transferred between the pair of mash tuns, it could be. Thus, a hydromagnetic resonator may be installed such that mash is treated as it is transferred from the first mash tun to the second mash tun and/or from the second mash tun to the first mash tun.

Clarifying—Wort is poured into a copper so that the boiling process can begin. Boiling the wort ensures its sterility, inhibits enzymatic activity, contributes to protein folding, and increases density. Hops may be added to the wort while it is boiling. This may be done to ensure that bitter substances from the hops have time to adsorb. Since many of the fragrant components will be destroyed over time, the hops may be added near the conclusion of the boiling process (e.g., approximately 15 minutes prior to conclusion) to provide flavor. The boiling process normally takes approximately 60-90 minutes to complete. Magnetic treatment is normally not performed during the boiling process. However, if the wort was magnetically treated prior to the boiling process, the duration of the boiling process may be reduced by nearly 50%.

Filtering—After the boiling process is complete, the wort will become turbid due to the hop particles (as well as coagulated proteins). These hop particles must be removed before the next stage of the brewing process begins. Accordingly, the wort may be filtered much like the mash was previously clarified. Some brewers employ centrifuges to separate the hop particles from the wort. Such an approach will cause the hop particles to be deposited near the center of the centrifuge while the wort will flow down the sides of the centrifuge. If the wort is magnetically treated (e.g., by a hydromagnetic resonator installed on the pipe that delivers the wort to the centrifuge), the duration of the filtration process may be reduced by nearly 50%.

Cooling—Filtered wort is then cooled before fermentation occurs. Normally, this is done as quickly as possible since prolonged cooling can significantly increase the risk of bacterial infection. For example, the filtered wort may be passed through a heat exchanger. Generally, magnetic treatment is not performed during the cooling process, through the filtered wort could be directed through a hydromagnetic resonator before or after being directed through the heat exchanger.

Fermenting—Fermentation is a key stage in the production of beer. The mechanisms of fermentation have traditionally been mysteries to brewers, and even today this stage of the brewing process is the most difficult to control. Fermentation is easier to regulate at lower temperatures. To initiate fermentation, yeast is added to the cooled wort. If the cooled wort is magnetically treated prior to fermentation (e.g., by a hydromagnetic resonator installed on a pipe that delivers the cooled wort to the fermentation tank), the duration of the fermentation process may be reduced by 30-80%.

Note that while various stages of the brewing process can be improved through the introduction of hydromagnetic resonators, improvements may also be based on the quality of the ingredients that are used (e.g., the water).

Some yeasts experience degradation at temperatures that exceed 41° F. (5° C.). Accordingly, brewers may perform cold fermentation rather than hot fermentation. In the cold fermentation process, the wort is cooled to a temperature below 41° F. (5° C.) before the yeast culture is added. Because the temperature of the wort will increase during fermentation, the temperature of the wort may be continually or periodically monitored. During fermentation, the yeast culture will multiply as it uses the wort as a food resource. As the amount of available oxygen decreases, reproduction of the yeast culture will cease and fermentation will begin. Yeast will synthesize the enzymes that convert sugars into alcohol and carbon dioxide. At lower temperatures, this process will proceed more slowly but more efficiently. After all of the sugars have been processed, the yeast will settle to the bottom of the fermentation tank. Cold fermentation is normally carried out in closed vessels over the course of 10-15 days. The sugars will be almost completely processed during this time, which allows the brewer to create a beer with a dry taste. After the yeast is added to the cooled wort, this mixture may be directed through a hydromagnetic resonator. Magnetically treating the mixture may cause the duration of fermentation to be lessened by 80-100%.

No further magnetic treatment may occur after fermentation has concluded. Thus, all further processes (e.g., maturating, filtering, pasteurizing, bottling) may take place as usual, that is, in the absence of hydromagnetic resonators. If magnetic treatment is performed at these stages, the degassing will tend to cause undesirable decarbonization of the beer.

Hydromagnetic resonators may be employed in various stages of the distilling process to achieve similar effects. For example, a hydromagnetic resonator may be installed such that water is treated before deposition into a mash tun, or a hydromagnetic resonator may be installed such that mash is treated before deposition into a fermentation tank. As another example, a hydromagnetic resonator may be installed such that vaporized alcohol is treated before or after being guided through the condenser. As another example, a hydromagnetic resonator may be installed such that distillate is treated before deposition into a retention tank.

Research has shown that constant magnetic exposure with changing magnetic field induction on oil-water emulsions destroys the stability of these emulsions. The synergy of the combined action of the magnetic field produced by the hydromagnetic resonators described herein and the acceleration of the process of demulsification of oil-water emulsions has an effect on the destruction of inverse oil emulsions. At a high level, there is a resonant destabilization of hydrogen bonds. As a result, complete or partial destruction of the oil-water emulsion occurs. In subsequent filtration processes, it is possible to lessen the concentration of fusel oils in fluids (e.g., spirits) to the extent that is optimal for lessening the hangover syndrome normally experienced by the human body. In short, magnetically treating the fluids used to produce alcoholic beverages may result in a decrease in fusel oils such that the hangover syndrome is lessened or eliminated.

Methodologies for Magnetically Treating Fluids

FIG. 10 depicts a flow diagram of a process 1000 for constructing a hydromagnetic resonator designed to magnetically treat fluid flowing therethrough. The process 1000 could be performed by a "manufacturer," who may be either an entity (e.g., via automation) or an individual. Initially, a manufacturer can acquire at least one convergent-divergent nozzle (step 1001). Each convergent-divergent nozzle may be designed to accelerate the flow of fluid passing from an inlet segment to an expansion segment through a throat segment. The manufacturer can also acquire a first expansion chamber that provides a tortuous path through a first magnetic field created by a first arrangement of permanent magnets (step 1002) and a second expansion chamber that provides a tortuous path through a second magnetic field created by a second arrangement of permanent magnets (step 1003). Generally, the first and second arrangements of permanent magnets are designed based on a characteristic of the fluid that will flow through the hydromagnetic resonator. Examples of such characteristics include the desired viscosity, density, etc. Note, however, that the first and second arrangements of permanent magnets do not need to be identical to one another. Thus, the first arrangement of permanent magnets in the first expansion chamber may be different than the second arrangement of permanent magnets in the second expansion chamber. In such a scenario, the first magnetic field will be different than the second magnetic field.

Then, the manufacturer can secure the at least one convergent-divergent nozzle between the first and second expansion chambers (step 1004), so that fluid is able to flow from the first expansion chamber through the at least one convergent-divergent nozzle into the second expansion chamber. In some embodiments, the manufacturer may secure a degassing component to the second expansion chamber (step 1005). Such an approach may be desirable if gas (e.g., air) should be removed from the treated fluid prior to egress from the hydromagnetic resonator.

Moreover, the manufacturer may insert the first expansion chamber, the at least one convergent-divergent nozzle, the second expansion chamber, and the degassing component into a durable housing (step 1006). As discussed above, the durable housing may be in the form of a hollow cylinder that has a first threaded end through which fluid is received and/or a second threaded end through which fluid is ejected. Such a design enables the hydromagnetic resonator to be easily installed in existing infrastructure.

Those skilled in the art will recognize that these steps could be performed in various orders. For example, the aforementioned components could be sequentially installed within the durable housing rather than inserted as a group. As another example, some steps may be performed multiple times depending on the arrangement of expansion chambers and convergent-divergent nozzles. For instance, if the manufacturer is interested in constructing the hydromagnetic resonator shown in FIG. 4A, then the manufacturer will connect multiple convergent-divergent nozzles in series between the first and second expansion chambers. However, if the manufacturer is interested in constructing the hydromagnetic resonator shown in FIG. 4B, then the manufacturer will acquire at least three expansion chambers and at least two convergent-divergent nozzles so that those components can be alternately arranged within the durable housing.

Figure 11:
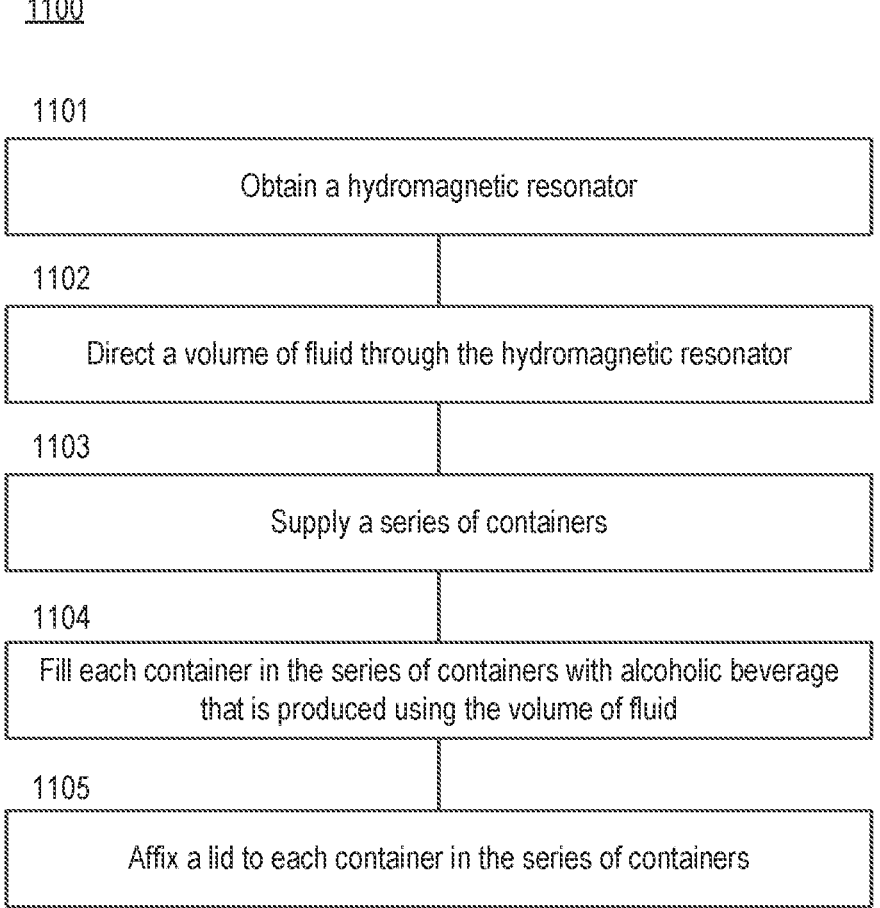
FIG. 11 depicts a flow diagram of a process for magnetically treating fluid with a hydromagnetic resonator.

FIG. 11 depicts a flow diagram of a process 1100 for magnetically treating fluid with a hydromagnetic resonator. The fluid may be air, water, mash, wort, alcohol vapor, and alcoholic beverage (e.g., distillate). The process 1100 could be performed by a "producer," who may be an entity or an individual. For example, an entity may deploy one or more hydromagnetic resonators throughout a brewing facility or distilling facility, or an individual may simply pour fluids through a hydromagnetic resonator as part of a homebrewing process. Initially, the producer can obtain a hydromagnetic resonator (step 1101). The hydromagnetic resonator can include one or more expansion chambers, one or more convergent-divergent nozzles, and one or more degassing components. As discussed above, each expansion chamber may provide a tortuous path along which fluid is able to flow through a magnetic field created by an arrangement of permanent magnets. This tortuous path may be defined by blade(s) that are integrally formed within the expansion chamber.

Then, the producer can direct a volume of fluid through the hydromagnetic resonator (step 1102). This may be accomplished by installing the hydromagnetic resonator within a brewing facility or distilling facility. For example, the producer may install the hydromagnetic resonator within a brewing system or distilling system such that the volume of fluid is routed through the hydromagnetic resonator as it travels from one stage to the next. AS another example, this may be accomplished by connecting the hydromagnetic resonator to a pipe (e.g., within a brewing facility, distilling facility, or home) that supplies a fluid such as water. As mentioned above, this could also be accomplished by manually directing fluid through the hydromagnetic resonator, though this approach is generally not appropriate for larger volumes of fluid that are typically handled by brewing facilities and distilling facilities. For instance, a producer could dump water into the hydromagnetic resonator in order to produce treated water that will be used in the production of a small batch of alcoholic beverage (e.g., for testing purposes).

As noted above, the hydromagnetic resonator could be installed within a brewing facility or distilling facility. As such, the producer may supply a series of containers (step 1103) and then fill each container in the series of containers with a portion of alcoholic beverage that is produced using the volume of fluid (step 1104). The nature of step 1104 will depend on the type of alcoholic beverage that is produced, as well as the type of fluid that is treated. Assume, for example, that the producer is a brewer who uses the hydromagnetic resonator to treat water that is used to produce beer. In such a scenario, the treated water is simply one component of the beer, which may be loaded into cans, bottles, kegs, and the like. As another example, the producer may be a distiller who uses the hydromagnetic resonator to treat distillate prior to bottling. Those skilled in the art will recognize that containers may have various shapes and sizes. For example, the producer could deposit alcoholic beverage into containers having volumes of 12 ounces (355 milliliters), 16 fluid ounces (473 milliliters), 25.36 ounces (750 milliliters), 33.82 ounces (1000 milliliters), 59.18 ounces (1750 milliliters), etc. Thereafter, the producer may affix a lid to each container in the series of containers (step 1105).

Unless contrary to physical possibility, it is envisioned that the steps described above may be performed in various sequences and combinations. Thus, a producer may perform the process 1100 of FIG. 11 multiple times in order to magnetically treat fluids, for example, at different stages of the brewing or distilling process. For example, a producer may use a first hydromagnetic resonator to treat water prior to deposition in a mash tun, a second hydromagnetic resonator to treat mash prior to deposition in a copper, etc.

Other steps may also be included in some embodiments. For example, the producer may opt to introduce a flavoring agent, an electrolyte-laden solution, or a mineral-laden solution into the volume of fluid. This could be done before, during, or after the fluid is magnetically treated. As another example, the producer may opt to introduce carbonation into the volume of fluid. Again, this could be done before, during, or after the fluid is magnetically treated.

REMARKS

The foregoing description of embodiments has been provided for the purposes of illustration. It is not intended to be exhaustive, nor is it intended to limit the claimed subject matter to the precise forms disclosed. Many modifications and variations will be apparent to one skilled in the art. Embodiments were chosen in order to best describe the principles of the technology and its practical applications, thereby enabling those skilled in the relevant art to understand the technology, its various embodiments, and the various modifications that are suited to the particular uses contemplated.

Although the present disclosure describes various embodiments, the technology can be practiced in many ways, no matter how detailed the present disclosure appears. Embodiments may vary considerably in their implementation, while still being encompassed by the present disclosure. Terminology that is used when describing characteristics, features, or aspects of various embodiments should not be taken to imply that the terminology is being redefined herein to be restricted to any specific characteristics, features, or aspects of the technology with which that terminology is associated. In general, the terms used in the claims should not be construed to limit the technology to specific embodiments, unless those terms are explicitly defined herein. Accordingly, the actual scope of the present disclosure encompasses not only the disclosed embodiments, but also all equivalent ways of practicing or implementing the embodiments.

The language used in the present disclosure has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method comprising:

obtaining a hydromagnetic resonator that includes— a first expansion chamber that provides a first tortuous path along which a fluid is able to flow through a first magnetic field created by a first arrangement of permanent magnets, a second expansion chamber that provides a second tortuous path along which the fluid is able to flow through a second magnetic field created by a second arrangement of permanent magnets, a convergent-divergent nozzle that is situated between the first and second expansion chambers and that includes (i) an inlet segment in which the fluid is received after traveling through the first expansion chamber, (ii) a throat segment that is designed to accelerate the fluid passing therethrough, and (iii) an expansion segment that is fluidly connected to the second expansion chamber, and a degassing component that removes at least some gas from the fluid prior to egress from the hydromagnetic resonator; and installing the hydromagnetic resonator such that a volume of the fluid to be used in the production of beer is directed through the hydromagnetic resonator during a brewing process.

2. The method of claim 1, wherein the fluid is air.

3. The method of claim 1, wherein the fluid is water.

4. The method of claim 1, wherein the fluid is a wort.

5. The method of claim 1, wherein the first and second tortuous paths are defined by at least one blade integrally formed in the first and second chambers expansion proximate to an ingress interface through which the fluid is received.

6. The method of claim 1, wherein the first and second expansion chambers are two of multiple expansion chambers included in the hydromagnetic resonator, wherein the convergent-divergent nozzle is one of multiple convergent-divergent nozzles included in the hydromagnetic resonator, and wherein the multiple expansion chambers and the multiple convergent-divergent nozzles are alternately arranged in the hydromagnetic resonator.

7. The method of claim 1, wherein the convergent-divergent nozzle is one of multiple convergent-divergent nozzles included in the hydromagnetic resonator, and wherein the multiple convergent-divergent nozzles are arranged in series between the first and second expansion chambers.

8. The method of claim 1, wherein the hydromagnetic resonator includes a housing with a pair of ends, and wherein said installing comprises:

engaging a first end of the pair of ends with a first pipe through which the volume of the fluid is received by the hydromagnetic resonator, and engaging a second end of the pair of ends with a second pipe through which the volume of the fluid is discharged by the hydromagnetic resonator.

9. The method of claim 1, wherein the fluid is a mash.

10. The method of claim 1, wherein the fluid is a fermented mixture.

11. The method of claim 1, wherein the hydromagnetic resonator includes a housing in the form of a hollow cylinder with a first threaded end and a second threaded end.

12. The method of claim 11, further comprising:

installing the hydromagnetic resonator by engaging the first threaded end with a first pipe through which the volume of the fluid is received, and

engaging the second threaded end with a second pipe through which the volume of the fluid is expelled.

13. The method of claim 1, wherein the first arrangement of permanent magnets is a different arrangement of permanent magnets than the second arrangement of permanent magnets.

14. The method of claim 1, wherein the convergent-divergent nozzle is one of multiple convergent-divergent nozzles included in the hydromagnetic resonator.

\* \* \* \* \*